(12) United States Patent
Zetterlund

(10) Patent No.: US 6,840,754 B2
(45) Date of Patent: Jan. 11, 2005

(54) ICE CREAM SCOOPER, MOTORDRIVEN

(76) Inventor: Karl Elof Zetterlund, 12625 Memorial Dr., 3, Houston, TX (US) 77024

( * ) Notice: Subject to any disclaimer, the term of this patent is extended or adjusted under 35 U.S.C. 154(b) by 154 days.

(21) Appl. No.: 10/201,843

(22) Filed: Jul. 24, 2002

(65) Prior Publication Data
US 2003/0024401 A1 Feb. 6, 2003

Related U.S. Application Data
(60) Provisional application No. 60/307,721, filed on Jul. 25, 2001.

(51) Int. Cl.⁷ .................................................. A23G 9/28
(52) U.S. Cl. ...................... 425/278; 425/279; 425/280; 425/283
(58) Field of Search ................................ 425/276–286; 30/124, 324; D7/681

(56) References Cited
U.S. PATENT DOCUMENTS 1,718,555 A * 6/1929 Halset ........................ 425/278
2,109,598 A * 3/1938 Stasinski .................... 425/278
2,157,813 A * 5/1939 Biskup ....................... 425/278
3,784,341 A * 1/1974 Magalotti et al. ........... 425/280
4,850,843 A * 7/1989 Ralls .......................... 425/279

* cited by examiner

Primary Examiner—James P. Mackey
Assistant Examiner—Donald Heckenberg

(57) ABSTRACT

This invention is a hand held motor driven scooper intended to facilitate handling of frozen ice cream and at the same time form attractive spheres of same. The device is equipped with a half circle shaped arc at the end of a tube, in which arc half circle shaped claws are inserted. The claws will slide in and out as per the operators command. When fully extended a circle shaped unit is formed. When operating in the substance the claws are first fully retracted and the arc is rotated until it is embedded in the substance. The operator then activates the claws which gradually extends during the continues rotation of the unit, until when fully extended a sphere of the substance has formed. When serving where intended, the sphere is released by command to retract the claws. The arc is not rotating whilst the claws are retracted.

4 Claims, 1 Drawing Sheet

ICE CREAM SCOOPER, MOTORDRIVEN

"This application claims priority to U.S. Provisional App. No. 60/307,721, filed Jul. 25, 2001."

CROSS REFERENCE TO RELATED APPLICATIONS

"Not Applicable"

STATEMENT REGARDING FEDERALLLY SPONSORED RESEARCH OR DEVELOPMENT

"Not Applicable"

INCORPORATION-BY-REFERENCE OF MATERIAL SUBMITTED ON A COMPACT DISC

"Not Applicable"

BACKGROUND OF THE INVENTION

1. Technical Field

This invention relates to mechanical devices for handling of frozen ice cream in order facilitate for the operator to dislodge in, removal from the substance and serving of an attractive spherical shaped unit of the product.

2. Related Art

It is to the knowledge of the inventor not found on the market and nor earlier patented a convenient operated motor driven device for handling frozen ice cream. The intention with this invention is to provide a device which when operated properly will caving it's way with ease through the substance and forming a spherical unit of the substance which easily can be served where applicable, by releasing the sphere from the unit on command of the operator.

BRIEF SUMMARY OF THE INVENTION

This invention is targeted to anyone whether at home or in a business handling frozen ice cream in bulk for serving in an attractive form.

In order facilitate the effort required, by greatly reducing muscular strain for the operator and especially for those who do this repeatable in commercial applications, this handheld unit comprises of a body which includes an electric motor which can be fed by an incorporated rechargeable battery or by an electric cord connected to a receptacle.

To the body a tube, which can rotate, is connected and which at the other end is attached to a half circle shaped arc. Inside the tube a rod is located which can rotate with the tube or separately. The rod is connected by a gear wheel to claws equipped with corresponding gear teeth and which claws can slide on the half circle shaped arc. A series of gear wheels located inside the handheld body will by command of the operator ensure that required action is accomplished. To operate, the half circle shaped arc to be located on top of the substance and brought to rotate by command of the operator. The are will then carving its way through the substance. When upper part of the arc is embedded, and when the arc continue to rotate the operator will give command for the claws to extend and thus when fully extended a sphere of the substance has formed. The sphere then to be moved over to the serving location and released from the unit by a command which let the claws retract whilst the am is not rotating.

THE DRAWINGS

FIG. 3 shows the clutch device.

DETAILED DESCRIPTION

Refer to attached drawing:

The invention consists of a hand held device having room for the operational mechanism, an electric motor and also a battery pack if so operated. Alternatively direct connected to power outlet via cord and voltage converter.

Figure 1B:
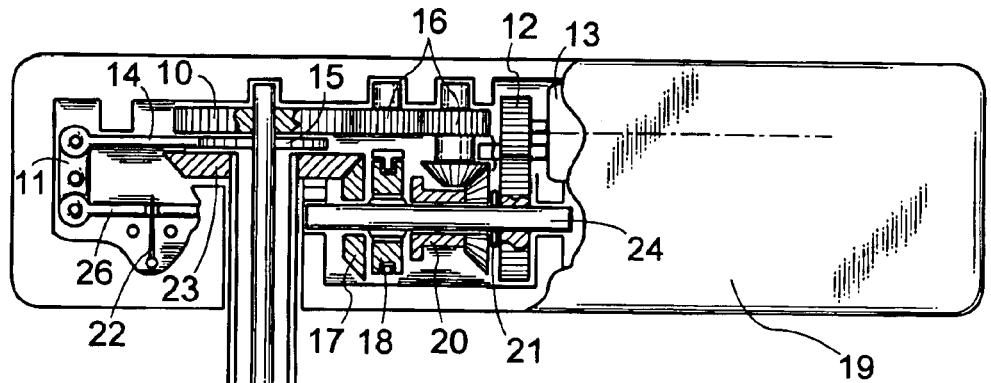
FIG. 1B shows how the claws are held in position within the scooper.
Figure 1B:
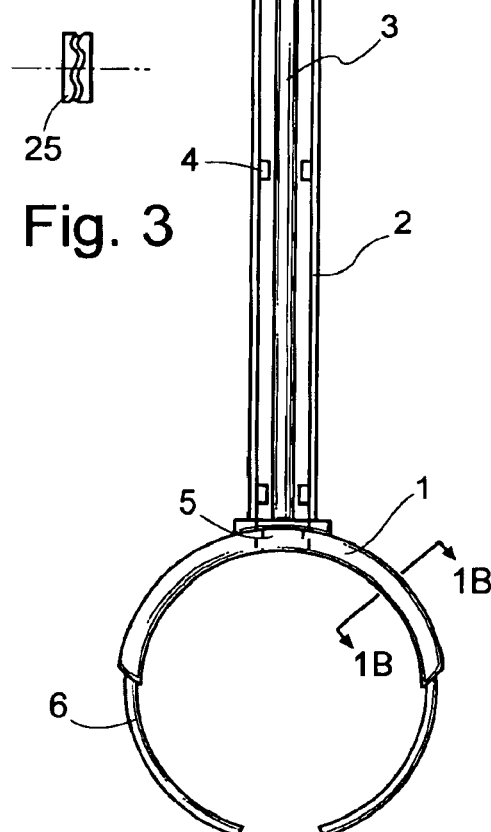
Figure 1B:
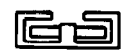
Figure 1A:
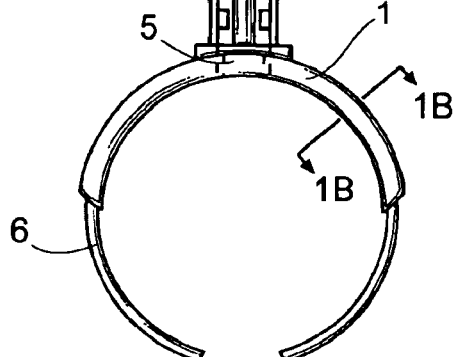
FIG. 1A shows the ice cream scooper.

From the handheld body an extension tube (2), as shown in FIG. 1A is provided and at which end a half circular body (1) is attached. Inside extension (2) a shaft (rod) item (3), is located which can rotate inside item (2), supported by bearings item (4). The lower end of shaft (3) is equipped with a small gearwheel (5) which operates the two sliding half circular grip claws (6) via corresponding sized gear teeth provided on the grip claws.

Figure 2A:
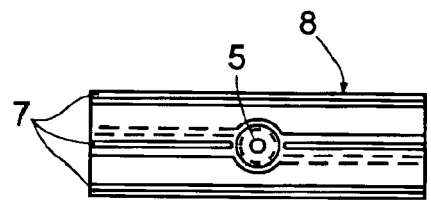
FIG. 2A shows a view of circular body with the grip claws retracted.
Figure 2B:
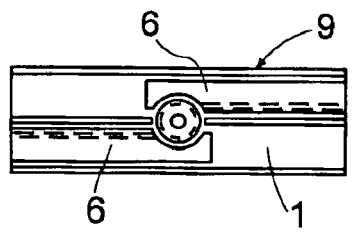
FIG. 2B shows a view of circular body with the grip claws extended.

Thus when item (2) is rotating and shaft (3) locked, or when only shaft (3) is rotating, the claws are forced to either extend out of item (1) or retract back to original position as decided by the operator using a single slide switch (not shown). FIG. 2A shows top view of item (1) with grip claws retracted and FIG. 2B shows top view of item (1) with grip claws fully extended.

FIG. 1B shows how the claws are held in position within item (1).

The upper part of item (2) is equipped with a gearwheel (23) connected to gearwheel (17), which is free rolling on shaft (24). The upper part of item (3) is fitted with a locking disc (15) and a gearwheel (10), which is connected to the free rolling gearwheel unit (20) via intermediate gearwheel's (16) Gear unit (20) is supported by the thrust collar (21), which is attached to shaft (24).

The sliding operational wheel (18) is connected to the shaft (24) via splines and can thus be moved forward or aft of its neutral position whilst rotating with the shaft (24). Each end of item (18) and corresponding end of gear wheels (17) and (20) are equipped with a clutch device item (25) FIG. 3. The shaft (24) is connected to the electric motor (13) via gear wheel (12).

Operation: The unit is equipped with a sliding knob having a "fork" operating in the center peripheral slot on item (18). Thus item (18) can be moved longitudinally on shaft (24) whilst the shaft is rotating. Furthermore the knob is linked to a rod item (26).

To start the operation, item (1) is placed on top of the ice cream and the knob is moved forward until item (13) clutches in with item (17). Further forward movement causes switch (22) to engage and the motor drives the whole unit (1,2 and 3) together and carving its way through the substance. When top of item (1) is embedded in the substance the knob is moved further forward causing the rod (14) via pivoting arm (11) to lock in to item (15). This means that shaft (3) is locked whilst item (1 and 2) are still rotating.

This will cause the claws to gradually move to full extension during the rotation and thus forming a complete sphere of the substance. By returning the knob to neutral position the motor will stop and the ice cam sphere is lifted out of the substance and held where the sphere is to be disposed off. By moving the operating knob aft wards the clutch on item (18) will engage with clutch part on item (20) and the motor will start because at the same time switch (22) is reconnected to the circuit. Only item (3) will rotate via the gearwheel combination and the claws will then retract and thus releasing the sphere. The operating knob is spring loaded both ways and held in neutral position by the spring forces when not in operation. The clutch will slip if/when excessive forces which may overload the motor should occur. Item(2) and (3) can be made detachable from the handheld operating unit.

What is claimed is:

1. A device comprising: a handheld operating body; a tube with an independent rotating rod inside, the tube attached to one end of the handheld operating body, and the tube attached to a half circular arc shaped body in the other end of the tube; two extendable and retractable claws shaped to move alongside a surface of arc shaped body shaped body, the arc shaped body together with the claws in a fully extended state forming a circular shaped body; wherein the tube is rotatable upon activation by a operator such that the circular shaped body forms a sphere of substance in which it is working upon.

2. Device as per claim 1, wherein more then one of said arc shaped bodies are attached to the tube at an angle in relation to each other, with each one of said arc shaped extendable and retractable claws being attached to one of said arc shaped bodies.

3. Device as per claim 1, wherein a gear wheel is attached at the end of said rod where said arc shaped body is located, and wherein the gear wheel operates with corresponding gear teeth on said arc shaped extendable and retractable claws to extend or retract the said claws depending on direction of rotation of said rod.

4. Device as per claim 1, with the handheld body incorporating a gear mechanism and an operating switch, which when said operating switch is moved in one direction from its neutral position will start the incorporated motor and activate rotation of the tube via one set of gear wheels and when moved further in same direction will activate a locking mechanism for the rod thus cause claws to extend during the rotation of said half circular arc shaped body; when the operating switch is moved in opposite direction, pass neutral, the gear wheels connected to the tube are deactivated, another set of gear wheels activates causing only the rod to rotate and the claws will retract.

* * * * *